Aug. 26, 1930.                A. PETERSEN                1,773,749
                              PISTON RING
                           Filed Nov. 10, 1926
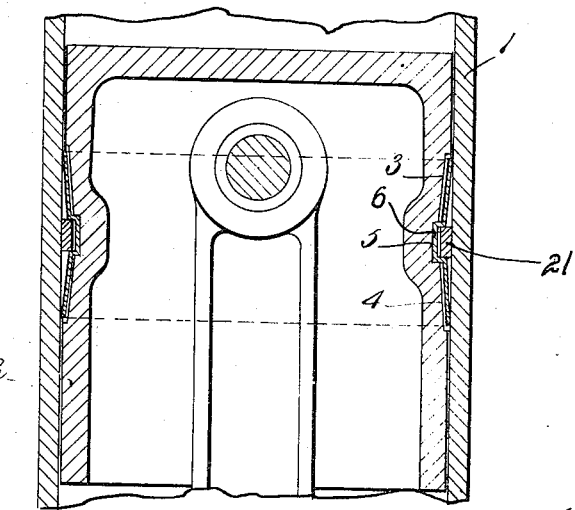
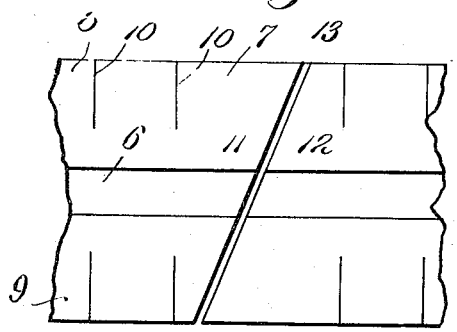
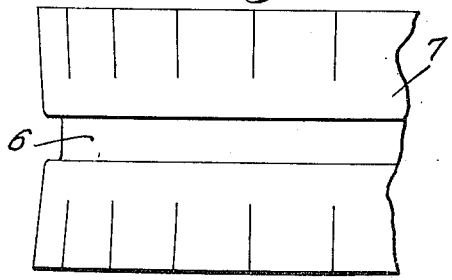
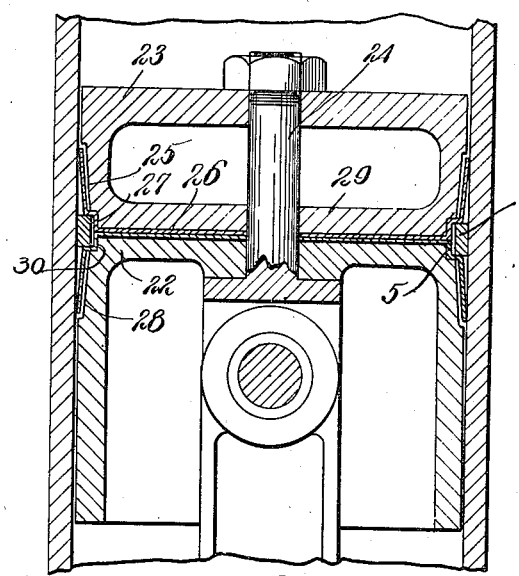
Inventor
Anker Petersen
by Roberts Cushman & Woodberry
Attys.

Patented Aug. 26, 1930

1,773,749

UNITED STATES PATENT OFFICE

ANKER PETERSEN, OF BOSTON, MASSACHUSETTS

PISTON RING

Application filed November 10, 1926. Serial No. 147,445.

This invention relates to piston rings or more particularly to means for preventing leakage of motive or pressure fluid past the piston in cylinders of pumps or fluid motors or of internal combustion engines or other similar or related mechanisms.

Among the objects of the present invention are to provide a novel form of piston ring or means for preventing leakage around or past the piston in a cylinder in which the ring or packing means shall be of such a form as to maintain contact with the cylinder walls during the working stroke of the piston. Another object of the invention is to provide a piston ring which is of a form and construction which is sufficiently flexible to be extended or expanded against the cylinder walls by fluid pressure, thereby serving to prevent leakage of fluid between the piston and the cylinder walls. A further object of the invention is to provide a piston packing ring or piston ring which may be readily mounted on or removed from a piston and which is adapted to operate in a manner so that the wear which takes place on the cylinder walls is small in comparison with that which occurs with the ordinary form of piston ring. With these and other objects in view the invention comprises the various features hereinafter more fully described and particularly defined in the claims.

The invention is shown in the accompanying drawings in a prefered embodiment and in a modified form thereof, in which:

Fig. 1 is a fragmentary cross-sectional view through a cylinder and a piston therein, the piston being shown provided with the preferred form of the improved ring or packing embodying my invention;

Fig. 2 is an enlarged fragmentary view in elevation of my preferred form of ring or packing, shown developed so as to lie in a plane;

Fig. 3 is an enlarged fragmentary view in elevation of the preferred form of packing shown in the form in which it is applied to a piston; and Fig. 4 is a sectional view similar to Fig. 1 showing a form of piston which is particularly adapted for assembling with a slightly modified form of my invention which will be hereinafter described.

Referring more in detail to the drawings, the numeral 1 designates a cylinder in which is a piston 2 of the usual form, to which the piston ring or packing of my invention may be applied. In order to provide a suitable seat for the packing or piston ring a circumferential depression or recess is formed in the outer surface of the piston. The depression forming the seat for my improved form of packing comprises preferably inwardly sloping slots of cut-out portions 3, 4, the sides of which slope so as to increase in depth from the outer sides of the section toward the central portion thereof, thus forming in effect the converging sections of two conical surfaces. At the central or deepest portion of the depression is a groove 5 adapted to hold a corresponding projecting channel portion 6 of the packing ring or piston ring 7 to be seated therein, the channel portion being of a size to substantially fit into the circumferential groove 5 in the piston. Connected to the channel portion of the ring or packing 7 are flexible skirt portions 8, 9, which set in the inclined slots or cut-out portions 3, 4, respectively, being slightly narrower than the corresponding slot in which each is seated or disposed.

The width of the inwardly sloping slots or cut-out portions depends upon the size of the pistons employed, although for cylinders of the ordinary size such as those of pumps or internal combustion engines, for example, I preferably employ slots or cut-out portions of about three to four inches in width, having a depth of substantially one-quarter of an inch adjacent the central groove portion, and a depth of about one-sixteenth of an inch at the exterior portions thereof, the slots being preferably sloped so as to provide an angle of about 5° with the piston surface, or in other words with an element of the cylindrical surface of the piston. It is to be understood, however, that this angle may be varied as may be found desirable depending upon the particular conditions under which the packing is to be used.

The packing material employed is preferably of a flexible metallic composition, such as spring steel, for example, although any suitable flexible composition my be employed. In the pumping of corrosive liquids, for example, a packing composed of a non-corrosive material might be used although I preferably employ spring steel, as above stated, under ordinary conditions.

As shown in Figs. 2 and 3 of the drawings, the improved form of packing comprises a strip of sheet metal 7 preferably bent into substantially cylindrical form having a channel or projecting portion 6 intermediate the side portions or skirt portions 8, 9, the projecting part 6 being adapted to fit into the groove 5 in the piston wall. The side portions 8, 9, of the packing or ring are preferably sloped at an inclination corresponding to the slope or inclination of the side portions 3, 4, of the recess or depression to which the packing is to be fitted, and ordinarily lie inside of the circumferential surface of the piston so that they do not bear with any substantial pressure on the cylinder walls. These skirt portions are preferably of thin material and are preferably slotted as shown at 10 to make them more flexible. The slots 10 extend inwardly from the edges of the skirt portions toward the channel portion or projection 6 and terminate a short distance from the latter portion thereof, whereby the sides of the members are rendered more flexible, so that the portions thereof between the cuts or openings may be easily bent outwardly against the cylinder wall by means of fluid pressure. The piston ring or piston packing is preferably made by stamping from a flat sheet of steel and is pressed or spun into the desired form, the material being then placed around the piston so that the extremities or outer ends 11, 12, thereof meet, the packing being held in place in contact with the corresponding groove and slots or cut-out portions by means of holding means, such as a ring 21 of any suitable form.

The auxiliary ring 21, employed for holding the piston packing may be the ordinary form of piston ring, and is preferably of a size so as to contact with the cylinder walls during reciprocation of the piston in the cylinder.

In the operation of the device when used in connection with the pistons of a pump or of an internal combustion engine, for example, the pressure of the motive fluid during the working stroke is exerted upon the top of the piston and a portion of the fluid passes around the piston between the cylinder wall and the sides of the piston and passes under the sections 13, or individual sections between the cuts or openings 10, which expand or are forced outwardly or radially against the cylinder wall providing a close joint between the piston and the side walls of the cylinder, preventing further downward passage of the gases or fluid. The packing or piston ring 6 serves therefore to prevent leakage or loss during the working stroke of the piston. During the return or exhaust stroke of the piston the sections 13 move away from the cylinder walls because of the release of pressure behind the sections and thus permits free return of the piston to its initial position without substantial contact of the sections on the inner surface or walls of the cylinder. In this way the sections 13 on the side 8 of the piston packing contact only with the cylinder wall during the forward stroke, and little wear occurs therefore upon the piston packing. The operation of the device as applied to the pistons of an internal combustion engine is substantially the same as when applied to oil pumps. In the case of a pump the sections 13 of the side 8 of the piston packing are dragged over the cylinder wall during the suction stroke of the pump, whereas during the working stroke the sections 13 of the side 8 are forced forwardly over the surface. In the case of an internal combustion engine the conditions are reversed, the sections 13 being forced into contact with the cylinder walls during the forward or explosion stroke, during which the sections are dragged over the surface, while during the exhaust or return stroke the pressure under the sections, expanding them radially outward into contact with the cylinder walls, is released, and the sections are thus permitted to seat upon the inclined slot 3 inside of the circumferential surface of the piston and out of substantial contact with the cylinder walls.

In the modified form of the device shown in Fig. 4 the piston is made in two sections 22, 23, which may be fastened together by means of a bolt 24, provided with a nut 25, or by any other suitable fastening or locking means. The portion 23 has a recessed or cut-out portion 25 increasing in depth toward the inner end 26 of the piston, and at this end is an annular depression or a cut-out portion 27 which forms on side of a groove 5 in the assembled device. The piston portion 22 has a recessed or cut-out portion 28 similar to the recess 25 in the member 23, the recess 28 increasing in depth toward the end 29 of the portion 22. At the end 29 of the piston portion 22 is an annular depression 30 corresponding to the cut-out portion 27 which forms the other side of the groove 5, in which the central projection 6 of the piston ring 7 is adapted to seat. In this form of the device the packing member is an annular metallic sleeve or endless belt, instead of a strip as shown in Fig. 2, the ends of which abut. In the modified form of the device the piston portions 22 and 23 may be inserted into the openings in each end of the sleeve member, and fastened into place, thereby avoiding the form of construction of the packing member as shown in Fig. 2. It is to be understood that various changes or modifications may be made in the device without departing from the spirit and scope of the invention as defined in the claims.

I claim:

1. A piston having a shallow circumferential recess comprising diverging walls meeting the cylindrical outer surface of the piston at a small acute angle and a packing ring seated in said recess and comprising a flexible metallic member having a central portion and skirt portions extending outwardly therefrom at such an angle that when the packing ring is inserted in the piston recess the said skirt portions will normally lie substantially in contact with the diverging walls of the recess.

2. A piston having a shallow circumferential recess comprising diverging walls meeting the cylindrical outer surface of the piston at an angle of substantially 5° and a packing ring comprising a metallic sheet member having a central portion and skirt portions extending outwardly therefrom at angles such that when the ring is seated in the piston recess, said skirt portions normally tend to engage the diverging walls of the recess, said skirt portions having sections formed therein by a series of substantially parallel cuts extending from the outer edge thereof toward the central portion of the ring.

3. A piston having a circumferential recess comprising a central groove and walls diverging therefrom and meeting the circumferential outer surface of the piston at an acute angle and a packing ring seated in said recess and comprising a thin sheet steel member having a central channel portion adapted to fit into the groove in the piston and diverging skirt portions extending outwardly from each side of the channel portion, said skirt portions each having a series of parallel openings forming flexible sections adapted to be expanded outwardly from the piston into acute angular contact with the adjacent cylinder walls in response to fluid pressure.

4. A piston having an annular piston ring recess comprising a central groove and side walls extending outwardly therefrom at an angle, a piston packing ring having a channel portion adapted to fit into the said groove and annular skirt portions extending outwardly from the said channel portion so as to contact substantially with the said side walls of the recess, and means for holding the said channel portion in pressure contact with the groove portion of said recess.

5. A piston having an annular piston ring recess comprising a central groove and inwardly sloping slots extending therefrom so as to increase in depth toward the central portion thereof, a piston packing ring adapted to fit the said recess having a central circumferential channel portion extending into the said groove, and annular skirt portions extending outwardly therefrom at an angle, said skirt portions having a series of independently movable sections adapted to be moved by fluid pressure into contact with the adjacent cylinder walls.

6. In a mechanism of the kind described, the combination comprising a cylinder, a piston therein having in a portion of its surface an annular groove and cut-out portions of decreasing depth extending outwardly from the groove at an angle of about five degrees, a band of flexible steel extending around said piston within said groove and cut-out portions, said band having a channel portion substantially fitting the said groove and side members extending outwardly from said projecting portion in contact with said cut-out portions, whereby pressure fluid may contact with the inner side of said side members to force them into contact with the adjacent cylinder walls.

Signed by me at Detroit, Michigan, this 30th day of October, 1926.

ANKER PETERSEN.